Feb. 21, 1967   J. LINDNER   3,305,741
MINIATURE ELECTRIC MOTOR
Filed March 4, 1964   2 Sheets-Sheet 1
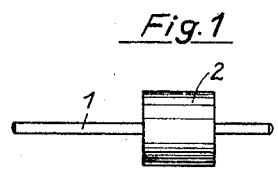
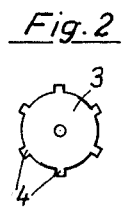
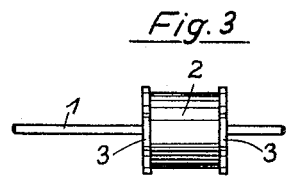
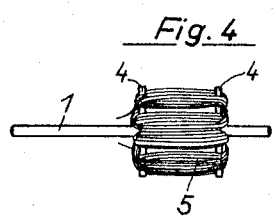
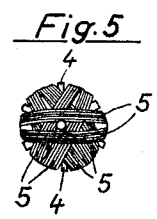
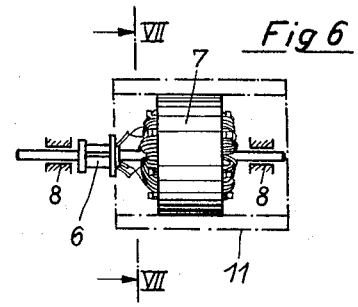
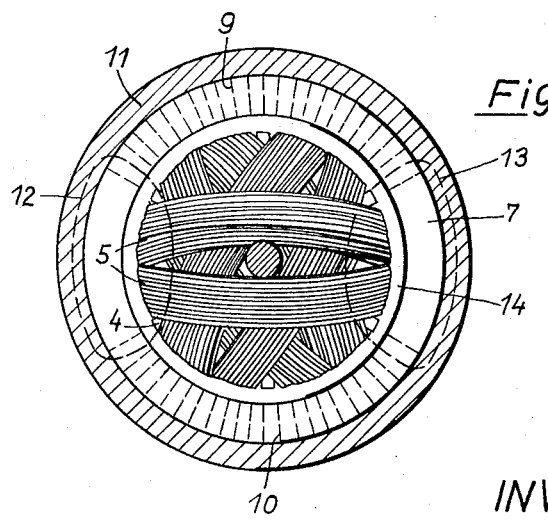
INVENTOR:
JOSEF LINDNER

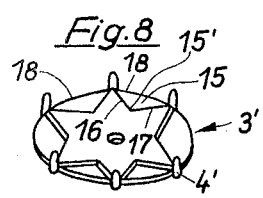
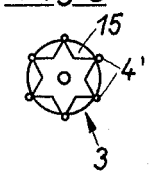
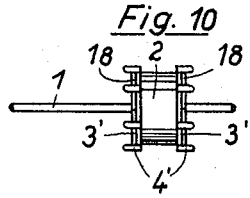
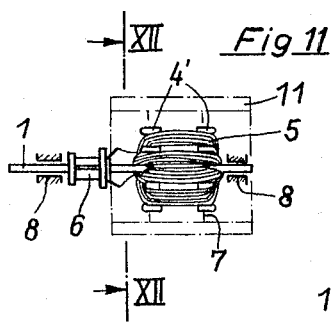
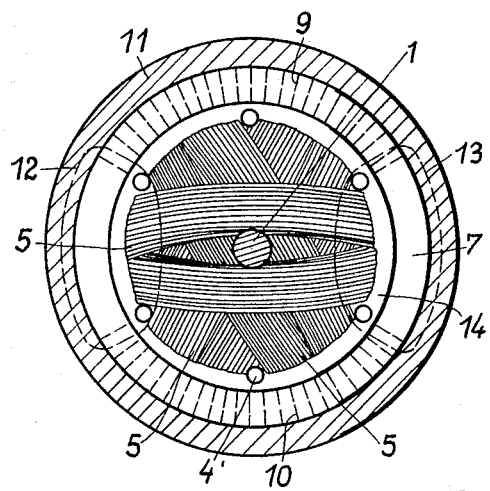

United States Patent Office 3,305,741
Patented Feb. 21, 1967

3,305,741
MINIATURE ELECTRIC MOTOR
Josef Lindner, Theresienplatz 8, Nurnberg, Germany
Filed Mar. 4, 1964, Ser. No. 349,432
Claims priority, application Germany, Mar. 5, 1963,
W 34,019; May 18, 1963, W 34,518
2 Claims. (Cl. 310—261)

The present invention relates to a small electric motor and especially a miniature motor which comprises a rotor of a ferromagnetic material with windings thereon and a stator which is located outside of the rotor and is provided with at least two diametrically opposite poles.

The known electric motors of this type generally have a rotor which is provided with longitudinal grooves into which the rotor windings are inserted so as not to project beyond the peripheral surface of the rotor. The T-shaped rotor parts between these grooves form poles which are attracted by the poles of the stator magnets whenever they approach the latter. The bearing clearance of the shaft of such a motor permits this shaft to reciprocate in a radial direction, whereby vibrations are produced which result in a very disagreeable noise and in a considerable and uneven wear upon the rotor bearings. This uneven wear, in turn, further increases the noise of the motor. Such a construction of the rotor has also the disadvantage that the motor runs very unevenly.

It is an object of the present invention to provide a small electric motor and especially a miniature motor which overcomes the disadvantages of the motor as described above and which is designed so as to run practically without any noise, to have the least possible wear on its bearings, and to permit it to be much more simply and easily manufactured than the known types of such motors.

According to the invention, this object is attained by making the rotor of a cylindrical, and preferably fully cylindrical, shape and of a laminated construction and without grooves, and by providing such a rotor with a drum winding which is fixed on the rotor so as not to shift in the peripheral direction thereof.

A rotor which is designed in this manner may be very easily produced. By making the rotor of a cylindrical shape, the magnetic field of the stator magnet or magnets between the poles thereof remains uniform within the air gap as well as in the rotor itself, and therefore it is possible to attain a quiet and steady operation of the rotor which is entirely without any rotor vibrations. This, in turn, means that the wear upon the bearings of the rotor is reduced to a minimum and that the motor according to the invention will remain fully operative for a very long time.

The features and advantages of the present invention will become further apparent from the following description of several preferred embodiments thereof which are illustrated in the accompanying drawings, in which—

FIGURE 1 shows an elevation of a rotor of an electric motor according to the invention;

FIGURE 2 shows a plan view of an insulating disk for the rotor;

FIGURE 3 shows an elevation of the rotor according to FIGURE 1 which is provided on its ends with a pair of insulating disks according to FIGURE 2;

FIGURE 4 shows an elevation of the rotor according to FIGURE 3 with a rotor winding wound thereon;

FIGURE 5 shows a side view of the rotor, as seen from the right of FIGURE 4;

FIGURE 6 shows an elevation of the rotor according to FIGURE 4 which is provided with a commutator and surrounded by an annular magnet;

FIGURE 7 shows an enlarged cross section which is taken along the line VII—VII of FIGURE 6;

FIGURE 8 shows a perspective view of an insulating disk according to a modification of the invention;

FIGURE 9 shows a plan view of the insulating disk according to FIGURE 8, but in approximately its natural size;

FIGURE 10 shows an elevation of the rotor according to FIGURE 1 which is provided with a pair of insulating disks according to FIGURE 9;

FIGURE 11 shows an elevation of the rotor according to FIGURE 10 which is provided with a commutator and rotor windings; while FIGURE 12 shows a cross section which is taken along the line XII—XII of FIGURE 11.

As illustrated in FIGURE 1, a cylindrical laminated rotor 2 is rigidly secured to the rotor shaft 1 and two insulating disks 3, as shown in FIGURES 2 and 3, which may consist, for example, of a thermoplastic material, and which are provided with central bores of a slightly smaller diameter than that of shaft 1, are drawn over the latter so as to adhere firmly to the shaft and to abut tightly against the opposite ends of the rotor 2. These insulating disks are provided with radial projections 4 between which three coils 5 are wound upon the rotor 2 in the manner as shown in FIGURES 4 to 7. The ends of the windings of each of these three coils 5 are electrically connected to the segments of a commutator 6.

As shown in FIGURES 6 and 7, the rotor shaft 1 is rotatably mounted in bearings 8 so that the rotor 2 is disposed centrally within an annular magnet 7 which consists of a hard ferrite and is magnetized in the radial directions at the areas indicated in FIGURE 7 by the dotted lines 9 and 10. These magnetic lines of force of the annular magnet 7 are closed at one side by the rotor 2 and at the other side by a tubular housing 11 into which the magnet 7 is inserted. Two of these closed lines of force 12 and 13 are indicated in dotted lines in FIGURE 7 which also shows that a relatively large air gap 14 is provided between the annular magnet 7 and the rotor 2.

The modification of the invention as illustrated in FIGURES 8 to 12 differs from the embodiment as previously described merely by the provision of different insulating disks 3' which may also consist, for example, of a thermoplastic material and are mounted in the same manner as previously described on the shaft 1 carrying the rotor 2, as shown in FIGURE 1, so as to adhere firmly to the shaft and to abut against the outer ends of the rotor. These disks 3' which, if desired, may be colored, are provided with a plurality of round projections 4' which extend parallel to the shaft 1 and away from the rotor 2 and serve for holding the windings of the coils 5 on the rotor and for separating them from each other.

On the outer sides of these disks 3', that is, on the sides toward which the projections 4' extend, both disks are provided in the sectors between the adjacent projections 4' with angular recesses 15 resulting in edges 16 and 17 which are adapted to support the windings of the coils 5. The individual windings of these coils 5 are further supported by the arcuate peripheral edges 18 of disks 3' between the projections 4'. Especially when the first layer of windings is being wound upon each disk 3', the individual windings have the tendency to slide laterally in the direction toward the projections 4'. This tendency is, however, completely overcome by the provision of the angular recesses 15 and the edges 16 and 17 thereof, as the result of which the individual wires will not slide in either direction but will always remain in the position in which they are applied upon the disks 3' during the winding operation.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A small electric motor comprising, in combination, a shaft; a rotor secured to said shaft and in the form of a cylindrical ferro-magnetic body having a substantially smooth and an uninterrupted cylindrical surface without grooves therein; a drum winding on said body in an engagement with said substantially uninterrupted cylindrical surface and secured against displacement circumferentially of said body; a stator surrounding said rotor and having at least two diametrically opposed poles; and a pair of substantially circular disks of insulating material having a diameter substantially equal to that of said cylindrical body and mounted on said shaft in engagement with the opposite ends of said cylindrical body, each of said disks having finger-like projections diametrically opposite to each other; said rotor winding comprising a plurality of separate coils each disposed between and separated circumferentially from each other by said projections; each of said disks being provided on its axially outer surface with an angular recess in each sector between two adjacent projections, said recesses having edges for supporting the windings between said projections.

2. An electric motor as defined in claim 1, in which said projections are in the form of short round pins extending substantially parallel to the axis of said disk and away from said disk.

References Cited by the Examiner

UNITED STATES PATENTS

| | | | |
|---|---|---|---|
| Re. 8,141 | 3/1878 | Weston | 310—46 |
| 406,429 | 7/1889 | Currie | 310—307 |
| 426,348 | 4/1890 | Thomson | 310—270 |
| 829,801 | 8/1906 | Ellis | 310—266 |
| 1,658,970 | 2/1928 | Colburn | 336—190 |
| 1,857,209 | 5/1932 | Moore. | |
| 2,532,700 | 12/1950 | Eurich | 310—46 |
| 2,598,211 | 5/1952 | Beliaeff | 310—46 |
| 2,894,156 | 7/1959 | Kent | 310—154 |

FOREIGN PATENTS

| | | |
|---|---|---|
| 1,022,031 | 12/1952 | France. |
| 619,481 | 3/1949 | Great Britain. |

MILTON O. HIRSHFIELD, *Primary Examiner.*

J. W. GIBBS, *Assistant Examiner.*